United States Patent Office 3,636,046
Patented Jan. 18, 1972

3,636,046
DERIVATIVES OF DIBENZO[b,f]PYR-
ROLO[3,4-d]AZEPINE
Hans Blattner and Walter Schindler, Riehen, Switzerland;
Herr Dr. Leonhard Gysin, executor and legal representative of said Walter Schindler, deceased, assignors to Ciba-Geigy Corporation, Ardsley, N.Y.
No Drawing. Filed Nov. 19, 1969, Ser. No. 878,177
Claims priority, application Switzerland, Dec. 19, 1968,
18,946/68
Int. Cl. C07d 27/36
U.S. Cl. 260—326.9                    6 Claims

ABSTRACT OF THE DISCLOSURE

Compounds of the class of 1,2,3,8-tetrahydro-dibenzo [b,f]pyrrolo[3,4-d]azepines and pharmaceutically acceptable acid addition salts thereof have a depressant effect on the central nervous system; they can be prepared from N-substituted 10,11-bis-bromomethyl-5H-dibenz[b,f]azepines and a primary amine; the compounds are active ingredients of pharmaceutical compositions; an illustrative embodiment is 2-ethyl-1,2,3,9-tetrahydro-dibenzo[3,4-d]azepine.

DETAILED DESCRIPTION

The present invention relates to new azepine derivatives, processes for the production thereof, medicaments containing the new compounds and their use.

More particularly, the present invention concerns compounds of Formula I (I)

wherein $R_1$ is hydrogen, methyl, ethyl or propyl, and
$R_2$ is hydrogen, straight chain lower alkyl with 1 to 4 carbon atoms, isopropyl or allyl, as well as pharmaceutically acceptable acid addition salts thereof.

As straight chain lower alkyl, $R_2$ can be the methyl, ethyl, propyl or butyl group.

A preferred class are compounds of Formula I, wherein $R_2$ is straight chain lower alkyl having 1 to 4 carbon atoms, isopropyl or allyl and the pharmaceutically acceptable acid addition salts thereof.

Preferred members are:

2-ethyl-1,2,3,8-tetrahydro-dibenzo[b,f]pyrrolo-
 [3,4-d]azepine;
2-allyl-1,2,3,8-tetrahydro-dibenzo[b,f]pyrrolo-
 [3,4-d]azepine;
2-butyl-1,2,3,8-tetrahydro-dibenzo[b,f]pyrrolo-
 [3,4-d]azepine;
2-ethyl-8-methyl-1,2,3,8-tetrahydro-dibenzo[b,f]-
 pyrrolo[3,4-d]azepine;

and the pharmaceutically acceptable acid addition salts thereof.

The compounds of the invention have been found to have a depressant effect on the central nervous system of mammals on oral, rectal or parenteral administration. These properties, in combination with a high therapeutic index render the compounds of the invention suitable as active ingredients of pharmaceutical compositions which can be used for the treatment of states of tension and agitation.

Compounds of Formula I are produced, according to the invention, by reacting a compound of Formula II (II)

wherein $R'_1$ is methyl, ethyl, propyl or a group which by means of hydrolysis can be replaced by hydrogen, with an amine of Formula III (III)

wherein $R_2$ has the meaning given under Formula I, hydrolysing the reaction product, if $R_1'$ is a group which, by means of hydrolysis, can be replaced by hydrogen, and optionally converting an obtained compound of Formula I with an inorganic or organic acid into an addition salt.

The bis-bromomethyl compounds of Formula II are reacted with the free bases of Formula III in the presence of a solvent. Suitable solvents are those which are inert under the reaction conditions, e.g. hydrocarbons such as benzene or toluene, halogenated hydrocarbons such as chloroform, lower alkanols such as methanol or ethanol, ether-like solvents such as ether or dioxane, as well as lower alkanones such as acetone, methylethyl ketone or diethyl ketone.

In the reaction, according to the invention, of one molar equivalent of the bis-bromomethyl compounds with one molar equivalent of free bases, two molar equivalents of hydrogen bromide are split off and preferably bound by the use of excess base of Formula III.

Groups $R_1'$ convertible by hydrolysis into the hydrogen atom, are, for example, acyl groups, e.g. lower alkanoyl groups such as the acetyl group, arylcarbonyl groups such as the benzoyl group, groups of monofunctional derivatives of carbonic acid such as, e.g. the methoxycarbonyl, ethoxycarbonyl or the phenoxycarbonyl group. The hydrolysis can be performed with the aid of an alkali metal hydroxide, e.g. potassium or sodium hydroxide, preferably at the boiling temperature, either in a higher boiling organic solvent containing hydroxyl groups such as, e.g. ethylene glycol or diethylene glycol, or in a lower monolkyl ether of such a glycol and, in particular, in a lower alkanol, e.g. methanol or ethanol. Moreover, the hydrolysis can be carried out, e.g. in acid medium, e.g. in alkanolic hydrochloric acid, or with the aid of hydrogen bromide in water or glacial acetic acid.

One starting material of Formula II, the 5-methyl-10, 11-bis-bromomethyl-5H-dibenz[b,f]azepine, is obtained, for example, as follows: 5-methyl-5,11-dihydro-10H-dibenz[b,f]azepin-10-one is converted with sodium amide into the 11-sodium derivative which in turn is methylated with methyl iodide to give the 5,11-dimethyl-5,11-dihydro - 10H - dibenz[b,f]azepine-10-one. The methylation product yields with magnesium and methyl iodide, according to the Grignard reaction, the 5,10,11-trimethyl-10,11-dihydro-5H-dibenz[b,f]azepin-10-ol, which is dehydrated, using polyphosphoric acid, to obtain the 5,10,11-trimethyl-5H-dibenz[b,f]azepine. Finally, the reaction product is brominated with N-bromosuccinimide.

A group of starting materials of Formula II are compounds which are substituted in the 5-position by an acyl group, e.g. the acetyl group, the methoxycarbonyl or ethoxycarbonyl group. The 5 - acetyl - 10,11-bis-bromomethyl-5H-dibenz[b,f]azepine is obtained, e.g. by acylating 10,11 - dimethyl - 5H-dibenz[b,f]azepine (cp. Geigy A.G. USA Pat. No. 3,130,191) with acetyl chloride and brominating the obtained 5-acetyl-10,11-dimethyl-5H-dibenz[b,f]azepine with N-bromosuccinimide. Further 5-acyl derivatives of Formula II can be produced analogously.

A second process according to the invention for the production of compounds of Formula I comprises alkylating a compound of Formula IV

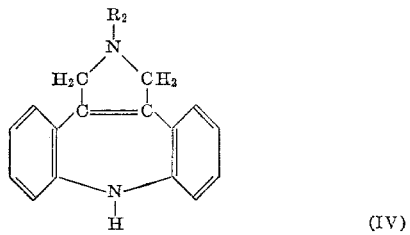

(IV)

in which $R_2$ has the meaning given under Formula I by means of a reactive ester of an alkanol of Formula V $$R_1'—OH \qquad (V)$$

in which $R_1'$ has the meaning of $R_1$ given under Formula I with the exception of hydrogen, preferably in the presence of a solvent and a basic condensing agent and, if desired, converting the compound of Formula I thus obtained into an acid addition salt thereof with an inorganic or organic acid.

Starting materials of Formula IV are prepared analogously to the first process by reacting 5-substituted-10,11-bis-bromomethyl-5H-dibenz[b,f]azepine compounds of Formula II, wherein $R_1'$ is a group which by means of hydrolysis can be replaced by hydrogen, with an amine of Formula III and subsequently hydrolysing the acyl compounds thus obtained. The hydrolysable groups at the 5-position and the methods for hydrolysing them are the same as mentioned in the first process.

A third process for the preparation of compounds of Formula I comprises reducing a compound of Formula VI

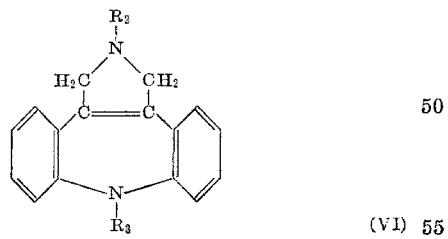

(VI)

wherein $R_2$ has the meaning given under Formula I and $R_3$ is an alkanoyl group, with diborane in ethereal solution and, if desired, converting a compound of Formula I thus obtained into an addition salt thereof with an inorganic or organic acid.

Suitable as reaction media are, for example, tetrahydrofuran, dioxane, methyleneglycoldimethylether or diethyleneglycolmethylether. The reaction temperature is preferably between room temperature and about 100° and reaction time preferably between about 30 minutes and 25 hours. The diborane is prepared, for example, from borontrifluorideetherate and sodium borohydride ether in situ or in a separate apparatus and subsequently added to the reaction mixture.

Starting materials of Formula VI in which $R_3$ as alkanoyl group can be the formyl, acetyl- or propionyl-group are prepared according to the first process and according to the process for the preparation of the starting compounds of Formula IV by reacting 5-alkanoyl-10,11 - bis - bromomethyl-5H-dibenz[b,f] azepine compounds of Formula II with an amine of Formula III.

5 - alkanoyl - 10,11 - bis-bromomethyl-5H-dibenz[b,f] azepine compounds of Formula II are obtained, for example, by acylating 10,11 - dimethyl - 5H-dibenz[b,f] azepine (cf. Geigy A.G. U.S. Pat. No. 3,130,191) with an alkanoyl chloride to give 5-alkanoyl- 10,11-dimethyl-5H-dibenz[b,f]azepine and then brominating the reaction product with N-bromosuccinimide.

A fourth process for the preparation of compounds of Formula I comprises hydrolysing a compound of Formula VII

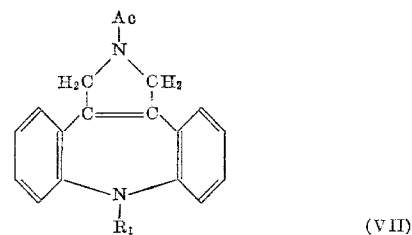

(VII)

in which $R_1$ has the meaning given under Formula I, and Ac is the acyl group of an organic acid and, if desired, converting a compound of Formula I into an addition salt thereof with an inorganic or organic acid.

In the starting material of Formula VII, Ac is in particular the acyl group of cyanic acid, chloroformic acid, a carbonic acid- or thiocarbonic acid mono-ester, a lower alkanoic acid or an arene carboxylic acid. Examples of acyl groups Ac are the cyano-, chlorocarbonyl-, methoxycarbonyl-, ethoxycarbonyl-, tert. butoxycarbonyl, phenoxycarbonyl-, benzyloxycarbonyl-, methoxythiocarbonyl-, methylthio-thiocarbonyl, acetyl- and the benzoyl group.

The hydrolysis of compounds of Formula VII is carried out, for example, by heating such compounds for several hours in an alkanolic or aqueous/alkanolic solution of an alkali metal hydroxide, for example, by boiling in a mixture of potassium or sodium hydroxide with ethanol or methanol and a little water. Apart from alkanol, other solvents containing a hydroxyl group may be used, such as ethylene glycol and monoalkyl esters thereof. Furthermore, compounds of Formula VII, in particular those in which Ac is the acyl group of cyanic acid, can be hydrolysed by heating with a mineral acid in an organic/aqueous or aqueous medium, for example, by boiling for several hours in a mixture of 85% phosphoric acid and formic acid or by heating for several hours in 48% hydrobromic acid at 60 to 70°.

The starting material of Formula VII is itself prepared by reacting a compound of Formula VIII

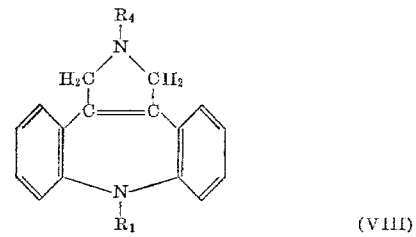

(VIII)

wherein $R_1$ has the meaning given under Formula I and $R_4$ is lower alkyl, allyl or benzyl, with an organic acylhalogenide, for example, a cyanogenhalide, in particular a cyanogenbromide, phosgen, a chloroformic acid alkyl ester, the chloroformic acid phenyl ester or -benzyl ester, a chloride or bromide of a lower alkanoic or benzoic acid, in particular acetyl chloride, acetylbromide or benzoylchloride, at room temperature or a raised temperature, whereby, according to the von Braun reaction, the desired acylation occurs with the splitting off of the group $R_4$. The reaction is carried out in an inert organic solvent such as, for example, chloroform or benzene or, if desired, also in an excess of an acyl-halide suitable as reaction medium.

The starting material of Formula VIII is prepared by reacting a compound of Formula II with an amine of Formula IX

in which $R_4$ is lower alkyl, allyl or benzyl, whereby similar reaction conditions are applied as described in the first process of the present invention.

The compounds of Formula I may optionally be converted, in the usual manner, into their pharmaceutically acceptable acid addition salts with inorganic and organic acids. For example, the acid desired as salt component, or a solution of the acid, is added to a solution of a compound of Formula I in an organic solvent. For the reaction, it is preferable to use organic solvents, in which the salt formed is not readily soluble, so that it can be separated by filtration. Such solvents are, e.g. methanol, acetone, methyl ethyl ketone, acetone/ethanol, methanol/ether or ethanol/ether.

Pharmaceutically acceptable acid addition salts are derived from such acids, the anions of which are non-toxic at the required dosage levels. Furthermore, it is of advantage if the salts to be used as medicaments readily crystallise and are not, or are only slightly hygroscopic. For salt formation with compounds of Formula I, it is possible to use, e.g. hydrochloric acid, hydrobromic acid, sulfuric acid, phosphoric acid, methanesulfonic acid, ethanesulfonic acid, β-hydroxyethanesulfonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid.

The depressant effect of the compounds of the invention on the central nervous system is demonstrated in a variety of standard animal tests [cp. R. Domenjoz and W. Theobald et al., Arch. int. Pharmacodyn, 120, 450 (1959), and W. Theobald and R. Domenjoz, Arzneimittelforschung 8, 18 (1958)]. In particular, it is demonstrated that the compounds of Formula I and the pharmaceutically acceptable acid addition salts thereof on oral, rectal or parenteral administration in amounts of from about 0.1 to about 20 mg./kg. to such test animals as mice and rats reduce motility, potentiate the action of analgesics and anesthetics, counteract the effect of amphetamine, exhibit a positive action in the "test de la traction," have an antiemetic, serotonin-antagonistic action and lower the body temperature. Also an antihistamic effect can be observed. The toxicity of the compounds of the invention is of favorable low order.

For their intended use in mammals, the compounds of the invention are administered in daily dosages of between 0.1 mg./kg. and 10.5 mg./kg. The exact dosages depend of course on the species, age and weight of the individuum under treatment as well as on the particular condition being treated and the form of administration.

Suitable dosage units such as dragées, tablets, suppositories or ampoules, preferably contain 5–200 mg. of an active substance, according to the invention, or of a pharmaceutically acceptable salt thereof.

Dosage units for oral administration preferably contain as active substance between 1 and 90% of a compound of Formula I or of a pharmaceutically acceptable salt thereof. They are produced by combining the active substance with, e.g. solid, pulverulent carriers such as lactose, saccharose, sorbitol, or mannitol; starches such as potato starch, maize starch or amylopectin, alo laminaria powder or citrus pulp powder; cellulose derivatives or gelatine, optionally with the addition of lubricants such as magnesium stearate or calcium stearate or polyethylene glycols, to form tablets or dragée cores. The dragée cores are coated, e.g. with concentrated sugar solutions, which can also contain, e.g. gum arabic, talcum and/or titanium dioxide or with a lacquer dissolved in easily volatile organic solvents or mixtures of solvents. Dyestuffs can be added to these coatings, e.g. to distinguish between varying dosages of active substance.

Other suitable dosage units for oral administration are hard gelatine capsules as well as soft, closed capsules made from gelatine and a softener such as glycerin. The hard capsules preferably contain the active substance as a granulate, e.g. in admixture with fillers such as maize starch, and/or lubricants such as talcum or magnesium stearate and, optionally, stabilisers such as sodium metabisulphite ($Na_2S_2O_5$) or ascorbic acid. In soft capsules, the active substance is preferably dissolved or suspended in suitable liquids such as liquid polyethylene glycols, whereby stabilisers can also be added.

Suitable dosage units for rectal administration are, e.g. suppositories consisting of a combination of an active substance, or of a suitable salt thereof, with a fatty foundation substance. Also suitable are gelatine rectal capsules containing a combination of the active substance, or of a suitable salt thereof with polyethylene glycol.

Ampoules for parenteral, especially intramuscular administration, preferably contain a water-soluble salt of an active substance in a concentration of preferably 0.5 to 5%, optionally together with suitable stabilising agents and buffer substances, in aqueous solution.

The following examples further illustrate the nature of the present invention but they should not be construed as a limitation of the scope thereof. The temperatures are given in degrees centigrade.

EXAMPLE 1

(a) 35 g. of 5-acetyl - 10,11 - bis-bromomethyl-5H-dibenz[b,f]azepine are dissolved in 250 ml. of anhydrous benzene. The obtained solution is added dropwise within one hour at 5–15° to a solution of 20 g. of methylamine in 180 ml. of anhydrous benzene. The reaction mixture is stirred for a further hour at 40°, cooled to 20° and 25 ml. of water are added all at once. The organic phase is separated, dried over potassium carbonate and completely concentrated by evaporation in a rotary evaporator. The residue, the 2-methyl-8-acetyl-1,2,3,8-tetrahydro-dibenzo[b,f]pyrrolo[3,4-d]azepine, is a viscous oil which, as crude product, is further processed.

(b) 23 g. of 2-methyl-8-acetyl - 1,2,3,8 - tetrahydrodibenzo[b,f]pyrrolo[3,4-d]azepine (crude product) are refluxed with 115 ml. of 20% ethanolic potassium hydroxide solution for 2 hours. The mixture is then cooled to 20° and the precipitated crude product is filtered with suction. The obtained 2-methyl-1,2,3,8-tetrahydro-dibenzo[b,f]pyrrolo[3,4-d]azepine melts, after recrystallisation from benzene, at 233–234°; 14 g. of the obtained base are stirred into 80 ml. of anhydrous acetone and the hydrochloride is precipitated with 11.3 ml. of 5 N anhydrous ethanolic hydrochloric acid. M.P. of the hydrochloride after recrystallisation from ethanol is 233–236°.

The starting material, the 5-acetyl-10,11-bis-bromomethyl-5H-dibenz[b,f]azepine, is produced as follows:

(c) 39.5 g. of acetyl chloride are added dropwise within 30 minutes, whilst stirring, to a solution of 98 g. of 10,11-dimethyl-5H-dibenz[b,f]azepine (cp. Geigy A.G., USA Pat. No. 3,130,191), M.P. 131–132°, in 295 ml. of toluene. The reaction mixture is afterwards refluxed for 5 hours, concentrated by evaporation in vacuo and the residue dissolved in ether. The ethereal solution is washed with water, dried over sodium sulphate and concentrated by evaporation. The residue, which is recrystallised from petroleum ether, yields the 5-acetyl-10,11-dimethyl-5H-dibenz[b,f]azepine M.P. 109–111°.

(d) 101 g. of 5-acetyl-10,11-dimethyl-5H-dibenz]b,f[azepine are dissolved in one litre of carbon tetrachloride and to the solution are added 138 g. of N-bromosuccinimide. By exposure to two 200 watt lamps or to a UV-lamp, the mixture is heated, while being stirred, to boiling. The mixture is kept boiling until all the N-bromosuccinimide is converted. The reaction mixture is cooled to 0° and 200 ml. of water are added. The precipitated crystalline 5-acetyl-10,11-bis-bromomethyl - 5H - dibenz[b,f]azepine, M.P. 175–176°, is filtered with suction.

EXAMPLE 2

Analogously to Examples 1(a) and (b) are produced the following intermediate products and final products:

(a) From 23 g. of 5-acetyl-10,11-bis-bromomethyl-5H-dibenz[b,f]azepine and 15 g. of ethylamine in 135 ml. of anhydrous benzene is obtained the intermediate product: 2 - ethyl - 8 - acetyl-1,2,3,8-tetrahydro-dibenzo[b,f]pyrrolo[3,4-d]azepine (crude product); and by subsequent saponification is obtained the final product: 2-ethyl-1,2,3,8 - tetrahydro-dibenzo[b,f]pyrrolo[3,4-d]azepine, M.P. 209–211° (from benzene); hydrochloride M.P. 260–264° (from ethanol);

(b) From 37.5 g. of 5-acetyl-10,11-bis-bromomethyl-5H-dibenz[b,f]azepine and 15 g. of propylamine in 135 ml. of anhydrous benzene is obtained the intermediate product: 2 - propyl - 8 - acetyl-1,2,3,8-tetrahydro-dibenzo[b,f]pyrrolo[3,4-d]azepine (crude product); and by subsequent saponification is obtained the final product: 2-propyl - 1,2,3,8 - tetrahydro-dibenzo[b,f]pyrrolo[3,4-d]azepine, M.P. 181–182° (from benzene); hydrochloride, M.P. 253–256° (from ethanol);

(c) From 37.5 g. of acetyl-10,11-bis-bromomethyl-5H-dibenz[b,f]azepine and 15 g. of allylamine in 135 ml. of anhydrous benzene is obtained the intermediate product: 2 - allyl - 8-acetyl-1,2,3,8-tetrahydro-dibenzo[b,f]pyrrolo-[3,4-d]azepine (crude product); and by subsequent saponification is obtained the final product: 2-allyl-1,2,3,8-tetrahydro - dibenzo[b,f]pyrrolo[3,4 - d]azepine, M.P. 174–176° (from benzene); hydrochloride, M.P. 245–249° (from ethanol); and (d) From 25 g. of 5-acetyl-10,11-bis-bromomethyl-5H-dibenz[b,f]azepine and 26 g. of butylamine in 150 ml. of anhydrous benzene, the intermediate product 2-butyl-8-acetyl - 1,2,3,8 - tetrahydro-dibenzo[b,f]pyrrolo[3,4-d] azepine (crude product); and by subsequent saponification, the end product 2 - butyl - 1,2,3,8-tetrahydro-dibenzo[b,f]pyrrolo[3,4-d]azepine, M.P. 156–157° (from ethanol); hydrochloride, M.P. 230–234° (from ethanol).

(e) From 29.5 g. of 5-acetyl-10,11-bis-bromomethyl-5H-dibenz[b,f]azepine and 22 g. of isopropylamine in 150 ml. of anhydrous benzene, the intermediate product 2-isopropyl-8-acetyl-1,2,3,8-tetrahydro - dibenzo[b,f]pyrrolo[3,4-d]azepine (crude product); and by subsequent saponification, the end product 2-isopropyl-1,2,3,8-tetrahydrodibenzo[b,f]pyrrolo[3,4-d]azepine, M.P. 197–198° (from benzene); methanesulphonate, M.P. 282–285° (from ethanol).

EXAMPLE 3

(a) 14 g. of 5-methyl-10,11-bis-bromomethyl-5H-dibenz[b,f]azepine are dissolved in 60 ml. of anhydrous benzene and the solution is added dropwise within one hour at 32–34°, whilst stirring is maintained, to a solution of 30 g. of methylamine in 270 ml. of methanol. The reaction mixture is stirred for a further one hour at 50° and the solvent and excess methylamine are then distilled off. 50 ml. of water are added to the residue and the suspension is extracted with ether. The ethereal solution is washed with water and extracted with 2 N hydrochloric acid. The acid aqueous extract is rendered alkaline to phenolphthalein with concentrated ammonia water and the precipitated base extracted with ether. The ethereal solution is washed with water, dried over potassium carbonate and concentrated by evaporation. The residue, the 2,8 - dimethyl-1,2,3,8-tetrahydrodibenzo[b,f]pyrrolo-[3,4-d]azepine, is recrystallised from petrol and melts at 120–121°; oxalate, M.P. 230–232°.

The starting material, the 5-methyl-10,11-bis-bromomethyl-5H-dibenz[b,f]azepine, is produced as follows:

(b) A suspension of 43 g. of sodium amide in 120 ml. of toluene is added dropwise within one hour at 65–75°, whilst vigorous stirring is maintained, to a solution of 223 g. of 5-methyl-5,11-dihydro-10H-dibenz[b,f]azepin-10-one in 1.5 litres of anhydrous benzene. The reaction mixture is subsequently refluxed for 2 hours. The suspension is afterwards cooled to 45–50°, 221 g. of methyl iodide are added dropwise within 2 hours at this temperature and stirring is maintained for a further 16 hours at 45–50°. The reaction mixture is cooled to 5–10° and to it are carefully added 250 ml. of water. The organic phase is separated, washed with water, dried over sodium sulphate and concentrated to ca. 400 ml. To this concentrated solution are added 200 ml. of petroleum ether, whereupon the 5,11-dimethyl-5,11-dihydro-10H-dibenz[b,f]azepin-10-one, M.P. 128–130°, crystallises out;

(c) A solution of 228 g. of 5,11-dimethyl-5,11-dihydro-10H-dibenz[b,f]azepin-10-one in 950 ml. of anhydrous benzene is added dropwise within 1½ hours, with vigorous stirring, to a Grignard solution prepared from 47 g. of magnesium and 273 g. of methyl iodide in 540 ml. of absolute ether, whereby a reaction temperature of −5 to 0° is maintained. The suspension is subsequently heated to 50° and stirring proceeds for a further 20 hours at this temperature. The reaction mixture is cooled to 0° and then poured on to a mixture of one litre of 2 N hydrochloric acid and 500 g. of ice. The organic phase is separated and the aqueous phase again extracted with benzene. The combined organic solutions are washed with water, dried over sodium sulphate and concentrated by evaporation in vacuo. The residue, which is recrystallised from petrol yields the 5,10,11 - trimethyl - 10,11-dihydro-5H-dibenz[b,f]azepin-10-ol, M.P. 102–104°;

(d) A mixture of 89 g. of 5,10,11-trimethyl-10,11-dihydro-5H-dibenz[b,f]azepin-10-ol and 890 g. of polyphosphoric acid is well stirred for one hour at 95–100°. The reaction mixture is cooled to 60–70° and slowly poured on to 3 litres of water at 40°, so that the reaction temperature does not exceed 60–70°. The precipitated product is filtered with suction at 20°, one litre of 2 N ammonia solution is added and the liberated base is extracted with benzene. The benzene solution is washed with water, dried over potassium carbonate and concentrated by evaporation. The residue, which is recrystallised from petrol yields the 5,10,11-trimethyl-5H-dibenz[b,f]azepine, M.P. 109–111°;

(e) 23.5 g. of 5,10,11-trimethyl-5H-dibenz[b,f]azepine are dissolved in 300 ml. of carbon tetrachloride and to the solution are added 36 g. of N-bromosuccinimide. Whilst being stirred and exposed to two 200-watt lamps, or to a UV-lamp, the mixture is heated to boiling. The mixture is maintained boiling until all the N-bromosuccinimide is converted. The reaction mixture is then cooled to 20° and 50 ml. of water are added. The organic phase is separated, washed with water, dried over sodium sulphate and concentrated by evaporation at 40° in vacuo. The residue is dissolved in 50 ml. of ether, the solution cooled to 0°, whereupon the 5-methyl-10,11-bis-bromomethyl-5H-dibenz[b,f]azepine, M.P. 127–130°, crystallises out.

EXAMPLE 4

The following end products are prepared analogously to Example 3(a).

(a) From 16 g. of 5-methyl-10,11-bis-bromomethyl-5H-dibenz[b,f]azepine and 25 g. of ethylamine in 150 ml. of methanol, the 2-ethyl-8-methyl-1,2,3,8-tetrahydro-dibenzo[b,f]azepine (crude product); oxalate, M.P. 208–210° (from methanol).

(b) From 39.5 g. of 5-methyl-10,11-bis-bromomethyl-5-H-dibenz[b,f]azepine and 28.5 g. of allylamine in 100 ml. of methanol, the 2-allyl-8-methyl-1,2,3,8-tetrahydrodibenzo[b,f]pyrrolo[3,4-d]azepine, M.P. 137–139° (from anhydrous ethanol), methanesulfonate, M.P. 194–196° (from anhydrous ethanol).

EXAMPLE 5

(a) To a suspension of 7.8 g. of 2-ethyl-1,2,3,8-tetrahydrodibenzo[b,f]pyrrolo[3,4-d]azepine in 40 ml. of dimethyl formamide are added 0.8 g. of sodium hydride at a temperature of 25–35°.

The reaction mixture is then stirred for a further hour at 80°, cooled to 20° and at this temperature a solution of 5.1 g. of propyliodide is added dropwise within 30 minutes. The reaction mixture is then stirred for 18 hours between 50 and 55°, cooled to 20° and water and ether then added. The organic phase is separated and extracted with 2 N hydrochloric acid.

The free base is precipitated out from the hydrochloric acid extract with concentrated ammonia water and taken up with ethyl ether. The ethereal solution is washed with water, dried over potassium carbonate and completely evaporated in a rotary evaporator. The residue yields, after recrystallisation from ethanol, 2-ethyl-8-propyl-1,2,3,8-tetrahydrodibenzo[b,f]pyrrolo[3,4-d]azepine, M.P. 105–107°. 2 g. of the obtained base are dissolved in 20 ml. of acetone and a solution of 0.87 g. of oxalic acid in 5 ml. of anhydrous ethanol is added, whereupon the oxalate crystallises out, M.P. (after recrystallisation from ethanol) 192–194°.

EXAMPLE 6

(a) 0.64 g. of diborane, freshly prepared from 2.6 g. of sodiumborohydride and 13 g. of borontrifluoride-etherate (G. Zweifel and H. C. Brown, Organic Reactions, Vol. XIII, page 32) are introduced with nitrogen into a solution of 13.5 g. of 2-ethyl-8-acetyl-1,2,3,8-tetrahydrodibenzo[b,f]pyrrolo[3,4-d]azepine in 70 ml. of anhydrous tetrahydrofuran, whilst the temperature is maintained between 0 and 5° by ice cooling. The mixture was then stirred for one hour at 0–5° and a further hour at 20–25°. 30 ml. of 10% sodium phosphate solution are then added dropwise and the tetrahydrofuran then evaporated in a rotary evaporator. The residue is heated to boiling under reflux for one hour with 300 ml. of 4 N hydrochloric acid, then cooled to 20° and rendered basic to phenolphthalein with concentrated sodium hydroxide. The precipitated base is extracted with ether. The ethereal solution is washed with water, dried over potassium carbonate and concentrated to a small volume, whereupon the 2,8-diethyl-1,2,3,8-tetrahydro-dibenzo[b,f]pyrrolo[3,4-d]azepine crystallises out. The crude product is recrystallised from ethanol, M.P. 100–102°. 5.8 g. of the obtained base are dissolved in 40 ml. of anhydrous acetone and 4 ml. of 5 N anhydrous ethanolic hydrogen chloride solution are added, whereupon the hydrochloride crystallises out; M.P. after recrystallisation from isopropanol, 267–271° (decomposition).

EXAMPLE 7

(a) 22 g. of 2-allyl-8-methyl-1,2,3,8-tetrahydro-dibenzo[b,f]pyrrolo[3,4-d]azepine are dissolved in 250 ml. of anhydrous benzene and boiled under reflux. A solution of 9.5 g. of ethylchloroformate in 100 ml. of anhydrous benzene is added dropwise to the reaction mixture within 30 minutes and the allylchloride formed simultaneously distilled off. After the end of the dropwise addition, the mixture is boiled for a further hour under reflux, then cooled to room temperature.

The benzene solution is washed with 2 N hydrochloric acid and then with water, dried over sodium sulphate and concentrated in vacuo to a small volume, whereupon the 2-carbethoxy-8-methyl-1,2,3,8-tetrahydro-dibenzo[b,f]-pyrrolo[3,4-d]azepine, M.P. 129–131°, crystallises out.

(b) 18 g. of 2-carbethoxy-8-methyl-1,2,3,8-tetrahydrodibenzo[b,f]pyrrolo[3,4-d]azepine are boiled for six hours under reflux with a solution of 18 g. of potassium hydroxide in 180 ml. of anhydrous ethanol. The ethanol is then distilled off from the reaction mixture in a rotary evaporator. The residue is taken up with 200 ml. of water and ether. The ethereal solution is stirred with 100 ml. of 2 N hydrochloric acid, whereupon the 8-methyl-1,2,3,8-tetrahydro-dibenzo[b,f]pyrrolo[3,4-d]azepine hydrochloride precipitates. After filtering under suction and washing with 2 N hydrochloric acid the crude product is dried in a vacuum cabinet and then recrystallised from ethanol, M.P. 274–278° (decomposition).

EXAMPLE 8

Analogously to Example 7(a) and (b), the following intermediate and end products are prepared.

(a) From 13.8 g. of 2-allyl-1,2,3,8-tetrahydrodibenzo[b,f]pyrrolo[3,4-d]azepine and 5.5 g. of ethyl chloroformate, the intermediate product 2-carbethoxy-1,2,3,8-tetrahydro-dibenzo[b,f]pyrrolo[3,4-d]azepine (crude product); and by subsequent saponification the end product 1,2,3,8-tetrahydro-dibenzo[b,f]pyrrolo-[3,4-d]azepine, M.P. 222–224° (from benzene); hydrochloride, M.P. 261–265° (decomposition) (from ethanol).

EXAMPLE 9

10 g. of 2-ethyl-1,2,3,8-tetrahydro-dibenzo[b,f]pyrrolo[3,4-d]azepine and 100 ml. of 99% of formic acid are boiled under reflux for 2 hours with stirring.

The excess formic acid is then evaporated in vacuo from the reaction mixture. The residue is dissolved in water, the base precipitated by the addition of concentrated ammonia and taken up in ether. The ethereal solution is washed with water, dried over potassium carbonate and evaporated. The residue, 2-ethyl-8-formyl-1,2,3,8-tetrahydro-dibenzo[b,f]pyrrolo[3,4-d]azepine is a viscous oil as crude product. 10 g. of the obtained base are dissolved in 30 ml. of absolute acetone and 6.9 ml. of 5 N anhydrous ethanolic hydrogen chloride are added, whereupon the hydrochloride crystallises out. After recrystallisation from methanol, the substance melts at 245–250° (decomposition).

The following prescriptions further illustrate the production of tablets, dragées, capsules, suppositories and ampoules.

EXAMPLE 10

250 g. of 2-ethyl-1,2,3,8-tetrahydro-dibenzo[b,f]pyrrolo[3,4-d]azepine hydrochloride are mixed together with 175.80 g. of lactose and 169.70 g. of potato starch. The mixture is moistened with an alcoholic solution of 10 g. of stearic acid, granulated through a sieve and dried. 160 g. of potato starch, 200 g. of talcum, 2.50 g. of magnesium stearate and 32 g. of colloidal silicon dioxide are mixed in and the mixture is pressed to form 10,000 tablets each weighing 100 mg. and each containing 25 mg. of active substance. Optionally, the tablets can be provided with grooves for finer adjustment of the dosage amount.

EXAMPLE 11

A granulate is produced from 250 g. of 2-ethyl-1,2,3,8-tetrahydro-dibenzo[b,f]pyrrolo[3,4-d]azepine-hydrochloride, 175.90 g. of lactose and the alcoholic solution of 10 g. of stearic acid. After being dried, the granulate is mixed with 56.60 g. of colloidal silicon dioxide, 165 g. of talcum, 20 g. of potato starch and 2.50 g. of magnesium stearate, and the mixture is pressed into 10,000 dragée cores. These are subsequently coated with a concentrated syrup made from 502.28 g. of crystallised saccharose, 6 g. of shellac, 10 g. of gum arabic, 0.22 g. of dyestuff and 1.5 g. of titanium dioxide, and dried. The obtained dragées each weigh 120 mg. and each contain 25 mg. of active substance.

EXAMPLE 12

To produce 1000 capsules each containing 25 mg. of active substance, 25 g. of 2-propyl-1,2,3,8-tetrahydrodibenzo[b,f]pyrrolo[3,4-d]azepine-hydrochloride are mixed with 248.0 g. of lactose. The mixture is evenly moistened with an aqueous solution of 2.0 g. of gelatine and is then granulated through a suitable sieve (e.g. Sieve No. III according to Ph. Helv. V). The granulate is mixed with 10.0 g. of dried maize starch and 15.0 g. of talcum. The obtained mixture is uniformly filled into 1000 hard gelatine capsules, size 1.

EXAMPLE 13

A suppository foundation mixture is prepared from 2.5 g. of 2 - propyl - 1,2,3,8 - tetrahydro - dibenzo[b,f]pyrrolo[3,4-d]azepine - hydrochloride and 167.5 g. of adeps solidus and from this mixture are filled 100 suppositories, each containing 25 mg. of active substance.

EXAMPLE 14

A solution of 25 g. of 2-ethyl - 8 - methyl - 1,2,3,8-tetrahydro - dibenzo[b,f]pyrrolo[2,3-d]azepine - hydrochloride in one litre of water is filled into 1000 ampoules and sterilised. An ampoule contains a 2.5% solution of 25 mg. of active substance.

What we claim is:
1. A compound of the formula

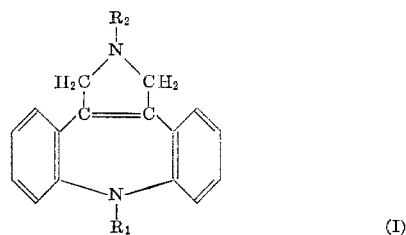

(I)

wherein $R_1$ is hydrogen, methyl, ethyl or propyl; and
$R_2$ is hydrogen, straight chain lower alkyl having 1 to 4 carbon atoms, isopropyl or allyl;

and the pharmaceutically acceptable acid addition salts thereof.

2. A compound according to claim 1, wherein $R_2$ is straight chain lower alkyl having 1 to 4 carbon atoms, isopropyl or allyl, and the pharmaceutically acceptable acid addition salts thereof.

3. A compound according to claim 1, which is 2-ethyl-1,2,3,8 - tetrahydro - dibenzo[b,f]pyrrolo[3,4-d]azepine or a pharmaceutically acceptable acid addition salt thereof.

4. A compound according to claim 1 which is 2-allyl-1,2,3,8 - tetrahydro - dibenzo[b,f]pyrrolo[3,4-d]azepine or a pharmaceutically acceptable acid addition salt thereof.

5. A compound according to claim 1 which is 2-butyl-1,2,3,8 - tetrahydro - dibenzo[b,f]pyrrolo[3,4-d]azepine or a pharmaceutically acceptable acid addition salt thereof.

6. A compound according to claim 1 which is 2-ethyl-8 - methyl - 1,2,3,8 - tetrahydro-dibenzo[b,f]pyrrolo[3,4-d]azepine or a pharmaceutically acceptable acid addition salt thereof.

References Cited
UNITED STATES PATENTS 3,514,462   5/1970   Hester _____ 260—293

ALEX MAZEL, Primary Examiner

J. A. NARCAVAGE, Assistant Examiner

U.S. Cl.X.R.

260—239, 326.3, 326.5 B; 424—274